United States Patent
Hutchins

(10) Patent No.: US 11,170,055 B2
(45) Date of Patent: Nov. 9, 2021

(54) ARTIFICIAL INTELLIGENCE AUGMENTED DOCUMENT CAPTURE AND PROCESSING SYSTEMS AND METHODS

(71) Applicant: OPEN TEXT SA ULC, Halifax (CA)

(72) Inventor: Gareth Edward Hutchins, Farnham (GB)

(73) Assignee: OPEN TEXT SA ULC, Halifax (CA)

( * ) Notice: Subject to any disclaimer, the term of this patent is extended or adjusted under 35 U.S.C. 154(b) by 152 days.

(21) Appl. No.: 16/235,112

(22) Filed: Dec. 28, 2018

(65) Prior Publication Data

US 2020/0210490 A1 Jul. 2, 2020

(51) Int. Cl.
| | |
|---|---|
| G06F 16/93 | (2019.01) |
| G06N 20/00 | (2019.01) |
| G06K 9/00 | (2006.01) |
| G06F 16/28 | (2019.01) |
| G06N 5/02 | (2006.01) |
| G06F 40/20 | (2020.01) |

(52) U.S. Cl.
CPC ............ *G06F 16/93* (2019.01); *G06F 16/285* (2019.01); *G06F 40/20* (2020.01); *G06K 9/00449* (2013.01); *G06K 9/00463* (2013.01); *G06K 9/00469* (2013.01); *G06N 5/02* (2013.01); *G06N 20/00* (2019.01); *G06K 2209/01* (2013.01)

(58) Field of Classification Search
None
See application file for complete search history.

(56) References Cited

U.S. PATENT DOCUMENTS

| | | | |
|---|---|---|---|
| 6,900,819 B2 * | 5/2005 | Marshall | G06F 40/169 345/667 |
| 2012/0041937 A1 * | 2/2012 | Dhillon | G06F 16/36 707/708 |

(Continued)

FOREIGN PATENT DOCUMENTS

WO  WO2018/128362  7/2018

OTHER PUBLICATIONS

International Search Report and Written Opinion issued for PCT/IB2019/061141 dated Apr. 9, 2020, 8 pages.

(Continued)

*Primary Examiner* — Tahmina N Ansari
(74) *Attorney, Agent, or Firm* — Sprinkle IP Law Group

(57) ABSTRACT

A document capture server receives a document image from a document capture client and processes the image into an electronic document containing textual content. During capture, the document capture server determines a graphical layout of the document, extracts keywords from the document, classifies the document accordingly, and calls an artificial intelligence (AI) platform to gain insights on the textual content. The AI platform analyzes the textual content and returns additional, insightful data such as a sentiment of the textual content. The document capture server can validate the additional data, integrate the additional data in a process or workflow, and/or provide the textual content and the additional data to a content repository or a computing facility operating in an enterprise computing environment. The document capture server can provide validated data to the AI platform to improve future analyses by the AI platform.

20 Claims, 9 Drawing Sheets

(56) References Cited

U.S. PATENT DOCUMENTS

| | | | |
|---|---|---|---|
| 2015/0112992 A1* | 4/2015 | Lee ..................... | G06F 16/907 |
| | | | 707/737 |
| 2018/0150905 A1* | 5/2018 | Lee ..................... | G06F 40/30 |
| 2019/0156426 A1* | 5/2019 | Drucker ............. | G06Q 30/0185 |
| 2020/0210490 A1* | 7/2020 | Hutchins ............ | G06K 9/00449 |
| 2020/0210521 A1* | 7/2020 | Hutchins ............ | G06F 16/345 |

OTHER PUBLICATIONS

International Preliminary Report on Patentability and Written Opinion issued for PCT/IB2019/061141, dated Jun. 16, 2021, 5 pgs.

* cited by examiner

300

123 The Road
Farnham
Surrey
GU9 9UG
Tel: 07977 269925
Email: Gareth.Hutchins@Opentext.com
Policy: 123-456-789
$12^{th}$ April 2018

On Wednesday the $11^{th}$ of April 2018, I was traveling from Farnham to the OpenText offices in Reading, Berkshire to meet Ben Poole.

On my way, I paid a visit to Starbucks in the Bracknell Sainsbury's and bought us both a couple of Coffees.

As I was leaving, a VW Golf, registration DE15 ABC, lost control while going around a roundabout in the rain and hit my Talbot Samba on the offside door. A reasonable amount of damage was caused to the door, preventing me from opening it. My nearside door was damaged some time ago and now my only entry and exit point to the Talbot Samba is through the sunroof.

Please find attached a quote for the repair work.

Thanks

Gareth Hutchins

123 The Road
Farnham
Surrey
GU9 9UG

Tel: 07977 269925

Email: Gareth.Hutchins@Opentext.com

Policy: 123-456-789

12$^{th}$ April 2018

On Wednesday the 11$^{th}$ of April 2018, I was traveling from Farnham to the OpenText offices in Reading, Berkshire to meet Ben Poole.

On my way, I paid a visit to Starbucks in the Bracknell Sainsbury's and bought us both a couple of Coffees.

As I was leaving, a VW Golf, registration DE15 ABC, lost control while going around a roundabout in the rain and hit my Talbot Samba on the offside door. A reasonable amount of damage was caused to the door, preventing me from opening it. My nearside door was damaged some time ago and now my only entry and exit point to the Talbot Samba is through the sunroof.

Please find attached a quote for the repair work.

Thanks

Gareth Hutchins

123 The Road
Farnham
Surrey
GU9 9UG

Tel: 07977 269925

Email: Gareth.Hutchins@Opentext.com

Policy: 123-456-789

12$^{th}$ April 2018

On Wednesday the 11$^{th}$ of April 2018, I was traveling from Farnham to the OpenText offices in Reading, Berkshire to meet Ben Poole.

On my way, I paid a visit to Starbucks in the Bracknell Sainsbury's and bought us both a couple of Coffees.

As I was leaving, a VW Golf, registration DE15 ABC, lost control while going around a roundabout in the rain and hit my Talbot Samba on the offside door. A reasonable amount of damage was caused to the door, preventing me from opening it. My nearside door was damaged some time ago and now my only entry and exit point to the Talbot Samba is through the sunroof.

Please find attached a quote for the repair work.

Thanks

Gareth Hutchins

FIG. 3C

ARTIFICIAL INTELLIGENCE AUGMENTED DOCUMENT CAPTURE AND PROCESSING SYSTEMS AND METHODS

TECHNICAL FIELD

This disclosure relates generally to the field of document capture and processing. More particularly, this disclosure relates to systems, methods, and computer program products for artificial intelligence augmented document capture and processing.

BACKGROUND OF THE RELATED ART

Document capture is a field of computer technology that provides a computer system with the abilities to capture documents in a variety of ways, for instance, scanning paper documents and storing them as digital images, importing electronic documents in one format and converting them to another format, etc. This kind of document processing focuses on the formats of the captured documents and is agnostic to the contents of the captured documents. Accordingly, in an enterprise computing environment, document capture is often combined with a content management system so that the captured documents can be processed and managed appropriately with respect to their contents.

SUMMARY OF THE DISCLOSURE

An object of the invention is to change the division of labor in processing captured documents by leveraging artificial intelligence (AI) to enhance document capture and to provide insight on unstructured data before providing the captured documents to a downstream computing facility such as a content management system operating in an enterprise computing environment.

Generally, this object can be achieved in a document capture server computer that can import/capture/ingest documents, convert them to appropriate format(s), enhance the documents, and apply optical character recognition (OCR) to the documents. Additionally, the document capture server computer can determine their graphical layouts respectively, extract keywords contained in the documents, and classify the documents based on their respective graphical layouts and/or extracted keywords. The document capture server computer can also perform zonal extraction for certain documents such as forms and perform freeform extraction for regular expression matching. However, before providing the documents to a downstream computing facility such as a content management system (CMS) or an enterprise content management (ECM) repository, the document capture server computer is operable to gain insights on the contents of the documents.

In some embodiments, during capture, the document capture server computer calls an AI platform with text and information that the document capture server computer has on the documents and/or has determined from the document capture server computer. The AI platform has an advanced natural language processing (NLP) text mining engine. The call from the document capture server computer specifies NLP text mining function(s) (e.g., sentiment analysis, concept extraction, category, etc.) to perform on the text and, in response, the AI platform returns insightful data such as a sentiment, concept, category, etc. The document capture server computer can validate (e.g., through integrity checks, user validation, etc.) the additional data from the AI platform. The documents and the additional data provided by the AI platform can then be integrated with processes run by the document capture server and/or other enterprise-grade systems (e.g., CMS, ECM, records management, etc.).

On the AI platform side, the invention disclosed herein can also provide benefits. For example, classification and/or information extracted/determined from a document by the document capture server and included in a request from the document capture server computer can be used by the AI platform in supervised machine learning of new graphical layouts and/or NLP concepts and entities.

In some embodiments, an AI-augmented document capture and processing method can include a document capture server computer receiving, from a document capture module running on a client device, an image of a paper document and processing the image into an electronic document. The processing can be performed at least in part on the document capture server computer or by the document capture module on the client device. Examples of processing can include, but are not limited to, a format conversion on the image, an image enhancement on the image, or an optical character recognition procedure on the image.

The document capture server computer can determine a graphical layout of the electronic document and/or extract keywords from the textual content of the electronic document. Based on the graphical layout of the electronic document and/or the keywords extracted from the electronic document, the document capture server computer can classify the electronic document. At this processing stage, the document capture server computer can also perform a zonal extraction of a form in the image and/or a freeform extraction for a regular expression in the image. The graphical layout of a document may indicate that the document contains structured data (e.g., a credit card application, a parts order form, etc.). If so, the document capture server computer can proceed to extract the structured data. For unstructured data, the document capture server computer can extract certain keywords from the textual content of the unstructured data, determine a class based on the extracted keywords, and obtain additional data (insights) from an AI platform.

In some embodiments, the document capture server computer can make a call (e.g., a web service call) to an AI platform (e.g., through an application programming interface (API) of an NLP text mining engine operating on a server computer of the AI platform). The call can contain the textual content, or a portion thereof, of the electronic document and the classification information of the electronic document, as determined by the document capture server computer. In some cases, the web service call can also include an identification of a knowledge base accessible by the AI platform server computer, the knowledge base specific to a class or type of the electronic document. The AI platform can (e.g., through the NLP text mining engine) analyze the textual content, or the portion thereof, of the electronic document and return additional data such as a sentiment or tonality of the textual content, or the portion thereof, of the electronic document. Examples of the additional data can include, but are not limited to, at least an entity, a summary, a category, or a concept that the AI platform learned from the textual content, or the portion thereof, of the electronic document.

The document capture server computer can validate the additional data returned by the AI platform, integrate the electronic document and the additional data with another system or process, and/or provide the electronic document and the additional data to a content repository or a computing facility operating in an enterprise computing environment. In some cases, a validated concept or entity from the data validation process can be provided to the AI platform. In turn, the AI platform can utilize the validated concept or entity from the data validation process performed by the document capture server computer in applying supervised machine learning to improve future analyses by the AI platform.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 3A depicts an example of an original document.

FIG. 3B depicts a version of the document shown in FIG. 3A, with information that can be captured by a document capture server computer according to some embodiments.

FIG. 3C depicts a version of the document shown in FIG. 3A, with additional data that can be captured by an NLP text mining engine of an AI platform according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Today, a document capture and extraction tool can enable a user to scan a paper document into an image (e.g., a .TIFF file, a .JPG file, etc.) and store the image file electronically (e.g., in a computer memory, a non-transitory computer-readable medium, etc.). In some cases, the document capture and extraction tool can include an OCR and/or other recognition functions (e.g., a barcode reader) and the user can choose whether and which recognition function should be applied to the scanned image.

At the consumer side, such a document capture and extraction tool can be implemented on a scanner device, copier, or a printer. At the enterprise side, a document capture solution is significantly more complex and, due to the volume of documents that must be processed at any given time on a continuing basis, is usually automated and implemented on a server machine or a cluster of server machines operating in an enterprise computing environment.

Generally, an enterprise document capture solution encompasses powerful software tools for handling high-volume scanning, classifying, and aggregating information from document collections. Information such as metadata and textual information thus obtained from the documents can be provided to enterprise-grade backend systems such as a document management system (DMS), an ECM system, etc. This allows the enterprise-grade backend systems to store and manage valuable information originated from paper documents.

Traditionally, the processing done by an enterprise document capture solution focuses on transforming paper documents to electronic ones. While OCR may be applied to a document image to extract textual information that can then be used to classify the content contained in the document image, no additional analyses are conducted by the enterprise document capture solution to gain insight on the content.

Figure 1:
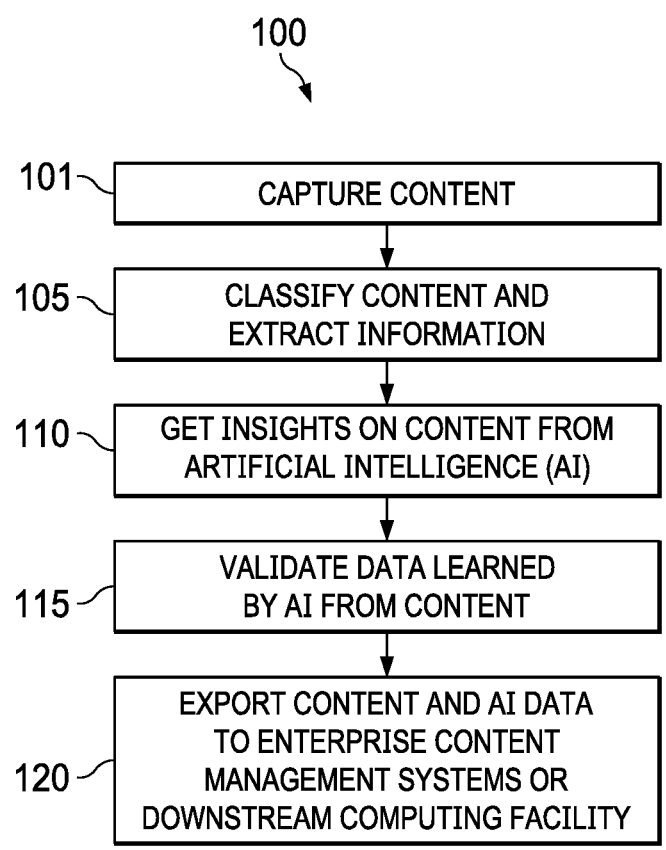
FIG. 1 depicts a flow chart illustrating an example of an overall process for AI-augmented document capture and processing according to some embodiments.

Embodiments disclosed herein improve traditional enterprise document capture solutions with AI-augmented advance analytics. FIG. 1 depicts a flow chart illustrating an example of an overall capture process 100 for AI-augmented document capture and processing according to some embodiments.

Figure 2:
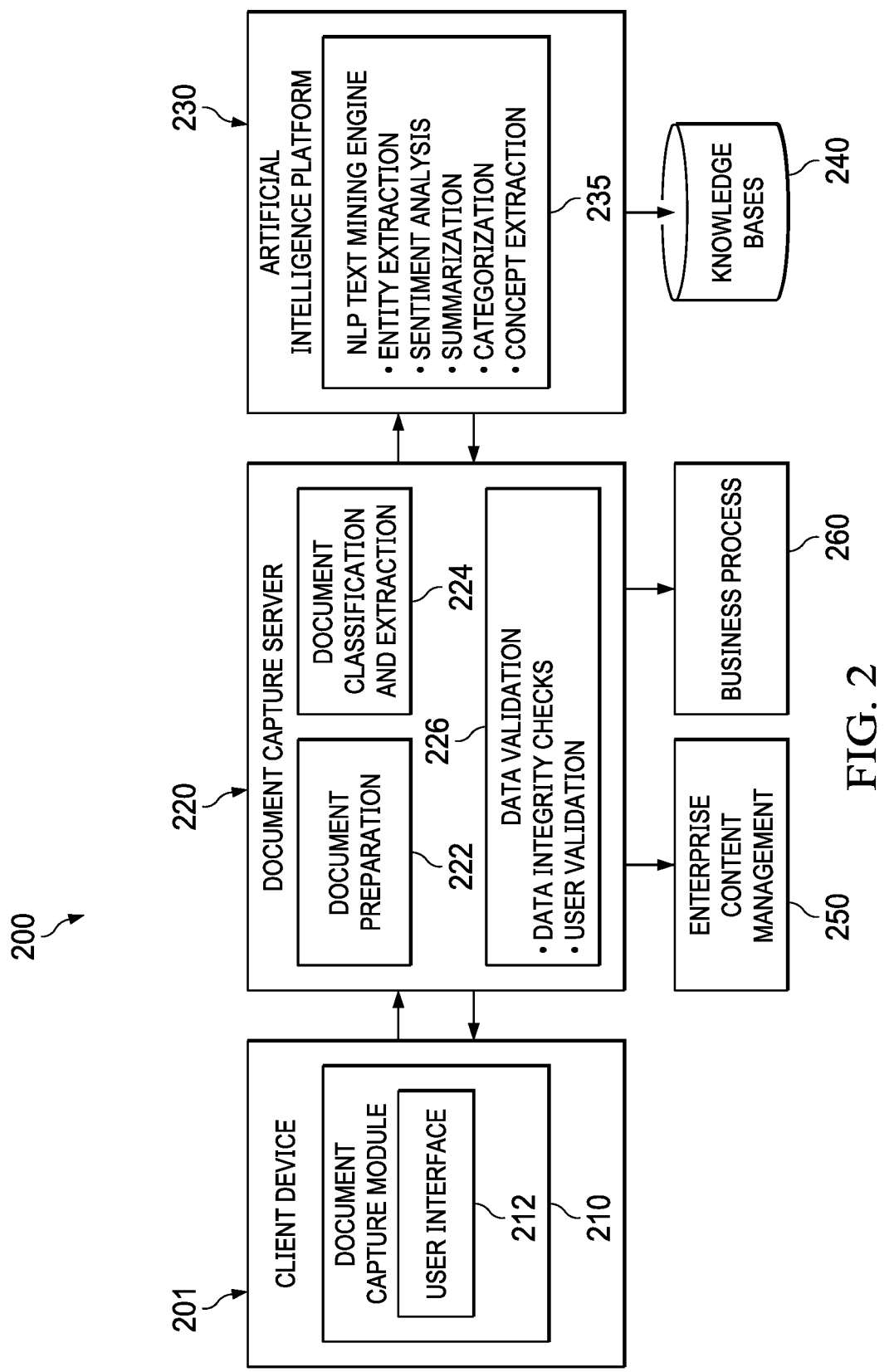
FIG. 2 depicts a diagrammatic representation of an example of an overall architecture including a document capture client, a document capture server, and an AI platform according to some embodiments.

In some embodiments, capture process 100 can include capturing content contained in a paper document (101). This step can take place on the client side and/or on the server side. FIG. 2 depicts a diagrammatic representation of an example of overall architecture 200 including a document capture module on a client device on the client side and a document capture server computer and an AI platform on the server side, according to some embodiments. The document capture server computer can provide services (e.g., a document capture service, an AI-augmented document capture service, an AI-augmented text mining/capture service, etc.) over a network to user devices and can operate in many suitable computing environments, for instance, on the premises of an enterprise, in a cloud computing environment, etc. OpenText™ Cloud, available from Open Text, headquartered in Waterloo, Canada, is an example of a suitable cloud computing environment.

As an example, on the client side, a user may start a document capture module, service, or application (e.g., document capture module 210) on the user's device (e.g., client device 201) and scan or take a picture of the paper document (e.g., through user interface 212). The document capture module can then send the picture or image of the paper document to a document capture server computer. As discussed below, the document capture module can include an image enhancement function. The picture or image may be automatically enhanced, or the user may use the image enhancement function to enhance the picture or image on the user device. Example user devices can include, but are not limited to, mobile devices, smart phones, laptop computers, tablet computers, desktop computers, portable computing devices, and so on.

On the server side, the document capture server computer (e.g., document capture server 220) can import or ingest documents from various sources (e.g., document capture module 210 running on client device 201, scanners, copiers, printers, fax servers, email servers, etc.), convert them into appropriate file formats (e.g., .PDF, .TIFF, .JPG, .BMP, etc.), enhance the images if/when/where necessary, and perform full text OCR on the images (e.g., as part of document preparation stage 222). The document capture server computer is capable of performing advanced recognition on structured and/or semi-structure documents (e.g., as determined from their graphical layouts). Processing of unstructured documents is further described below.

In some cases, the document capture module can perform OCR on the client side and provide the textual output from the OCR to the document capture server computer along with the image of the paper document. Information captured this way is unstructured.

The document capture server computer is operable to classify content and extract information such as keywords from the content (105). The document capture server computer can classify a document in multiple ways. For instance, the document capture server computer can analyze a document, determine a graphical layout of the document, and determine a class or type for the document based on the graphical layout. Likewise, the document capture server computer can analyze a document, identify keywords in the document, extract those keywords from the document, and determine a class for the document based on the keywords extracted from the document. At this processing stage (e.g., document classification and extraction stage 224), the document capture server computer can perform other document analyses such as zonal extraction and freeform extraction for certain types of documents (e.g., documents with forms, documents with regular expressions), etc. Zonal extraction, also referred to as template OCR, can extract text located at a specific location or zone within a document.

Unstructured content does not have a fixed, recognizable data structure. The textual information contained therein, however, may have a syntactic or linguistic structure that could offer insights on the semantic meaning, tonality, concept, entity relationship, etc. conveyed in the underlying document. While the document capture server computer is extremely proficient in classifying documents (e.g., various types of documents such as invoices, purchase orders, contracts, complaints, forms, insurance claims, etc.), it does not have advanced data processing capabilities like text mining, entity extraction (e.g., person name, organization name, etc.), concept extraction, sentiment analysis (e.g., opinion versus fact, positive versus negative, etc.), summarization (e.g., reducing paragraphs down to a few sentences), categorization, etc.

For example, while the document capture server computer can classify a document as an insurance claim, it cannot determine whether it is a home insurance claim or an auto insurance claim. However, the AI platform can comprehend (e.g., through machine learning) that the document is actually a car accident insurance claim. As another example, while the document capture server computer can extract keywords and phrases, it cannot recognize a person's name and associate that person's name with an account number. However, the AI platform can learn how a named entity (e.g., a person's name) is associated with another named entity (e.g., an account) and recognize the relationship between such entities.

In some embodiments, the document capture server computer is operable to gain such insights through an AI platform (e.g., AI platform 230) (110). As explained further below, this may entail calling an NLP text mining engine (e.g., NLP text mining engine 235) of the AI platform (e.g., via a web service call to an API of NLP text mining engine 235) with the textual information obtained from the unstructured content and any information (e.g., a content class) determined from the unstructured content by the document capture server computer.

In some cases, the web service call can optionally include an identification of a knowledge base (e.g., a knowledge base in data store 240) accessible by the AI platform server computer. The knowledge base can be specific to the content class. The AI platform can (e.g., through NLP text mining engine 235) analyze the textual information and return mined results, such as a sentiment or tonality of the textual information, a named entity, a summary, a category, a concept, etc., that the AI platform has learned from the textual information and/or the content class provided by the document capture server computer.

Before describing capture process 100 further, a discussion of NLP text mining engine 235 might be helpful. NLP text mining engine 235 is configured for performing a plurality of text mining functions, including entity extraction, sentiment analysis, summarization, categorization, concept extraction, etc.

For entity extraction, NLP text mining engine 235 is operable to extract named entities. For instance, suppose a document describes that a specific company is releasing a new product. Based on linguistic rules and statistical patterns, NLP text mining engine 235 can extract the company's name, the new product name, etc. from the document. All occurrences of an entity type may be extracted. For synonyms, acronyms, and variations thereof, an authority file may be used. An authority file refers to a controlled vocabulary of terms and cross-reference terms that assists entity extraction to return additional relevant items and related metadata (e.g., geopolitical locations, person names, organization names, trademarks, events, etc.). There can be multiple authority files, each for a particular controlled vocabulary of terms and cross-reference terms.

Output from entity extraction can be a list of extracted entities with attributes and relevancy ranking. Since text mining is performed at the document level, the extracted metadata (e.g., the company's name and the new product name in this example) can be used to enrich the document. NLP text mining engine 235 can learn how to determine an entity based on previous examples from which a model has been trained using machine learning. For example, suppose multiple documents mention a company name "Company X" following a product name "ABC," NLP text mining engine 235 may learn from these examples and determine to add an entity "Company X" for a new document that mentions the product name "ABC", even if the new document does not explicitly mention the company name "Company X."

For sentiment analysis, NLP text mining engine 235 is operable to programmatically examine a piece of content (e.g., a post, a document, a tweet, an article, a message, etc.) in an even more fine-grained manner. For instance, for a given sentence in a document that describes a company releasing a new product, NLP text mining engine 235 is operable to analyze the sentence and determine whether the sentiment for the totality of the sentence is positive, negative, or neutral. Since NLP text mining engine 235 also extracts the company name and the product name, the sentiment or tonality detected in a sentence by NLP text mining engine 235 can be associated with an entity or entities (e.g., the company and/or the product) in the sentence. At the entity level, multiple instances of a given entity can be combined to assess an overall sentiment value for the entity. In this way, what the document says about the product (e.g., a positive tone, a negative tone, or a neutral tone) at various levels (e.g., at the document level, the sentence level, the entity level, etc.) can be captured and leveraged by a content analysis (along with other documents relevant to the company and the product), for instance, for trend analysis and mood detection. NLP text mining engine 235 can also leverage machine learning to learn how to determine a sentiment, for instance, by running a machine learning algorithm that utilizes input data and statistical models (e.g., NLP models or NLP classifiers) to predict an output value (e.g., a tone value).

For conception extraction, NLP text mining engine 235 is operable to extract key concepts, including complex concepts. For example, concepts can be identified with an algorithm based on linguistic and statistical patterns (e.g., keywords and key phrases). These can include the most relevant noun(s) and phrase(s) for a given purpose. The extracted concepts can be weighted ranked such that they are outputted with relevancy ranking.

For categorization, NLP text mining engine 235 is operable to programmatically examine the input text and determine, according to a controlled vocabulary (a taxonomy—a scheme of classification), a best topic for the document and attach the topic to the document. For instance, a news article discusses that a president is going to visit a country. NLP text mining engine 235 is operable to programmatically examine the article, determine that this article concerns foreign affair and/or diplomacy, and add "foreign affair" and/or "diplomacy" as metadata (e.g., "category=foreign affair" or "topic=diplomacy") to the article, even if the article itself does not literally contain "foreign affair" or "diplomacy." Downstream from text mining, these pieces of metadata can be used by AI platform 230 in different ways for various reasons. For instance, the vocabulary of NLP text mining engine 235 can be enhanced using machine learning techniques. Additionally or alternatively, an immediate change can be made to NLP text mining engine 235 or through a user interface. NLP text mining engine 235 is capable of learning how to categorize new content based on previous examples from which a model has been trained using machine learning (e.g., using taxonomies, training sets, and rules grouped in a categorization knowledge base). There can be multiple categorization knowledge bases. Output from categorization can include a list of extracted categories with relevancy rankings and a confidence score rating for each category.

Generally, summarization refers to the process of shortening a text document in order to create a summary with the major points of the original document. To perform summarization, NLP text mining engine 235 is operable to identify the most relevant sentences in a piece of content using, for instance, an output from the categorization, and generate a summary with the identified sentences. For instance, sentences with the highest relevancy can be identified, extracted, and included in the summary. This is a much more precise way to identify relevant content at the sentence level.

Each of the text mining functions of NLP text mining engine 235 can be implemented as a component of the underlying AI platform 230. For example, the sentiment analysis function can be implemented as a sentiment analysis component of AI platform 230 and the summarization function can be implemented as a summarization component of AI platform 230. OpenText™ Magellan, also available from Open Text, is an example of a suitable AI platform 230. OpenText™ Magellan is a flexible AI and analytics platform that combines machine learning, advanced analytics, data discovery, and enterprise-grade business intelligence with the ability to acquire, merge, manage, and analyze structured and unstructured big data.

The NLP text mining capabilities of AI platform 230 in some cases can be accessible through a text mining service (e.g., by making an API call to an API endpoint—a base universal resource locator (URL)—where an instance of the text mining service is hosted on a server computer of AI platform 230). The text mining service (which can be a type of web services) accepts an eXtensible Markup Language (XML) post that contains the text to be analyzed, as well as what text mining functions to be used. For example, a request to the text mining service of AI platform 230 for the tone and sentiment of a text block may contain the following information:

```
<?xml version="1.0" encoding="UTF-8" ?>
<AIserver>
    <text_block> This is a story about John Doe. He lives in Farnham
in Surrey and works for OpenText in Reading. He's pretty cool.
</text_block>
```

```
        <Methods>
            <Sentiment/>
        </Methods>
    </AIserver>
```

In response to this request, the text mining service can return the sentiment and tone of each sentence in the text as well as the whole piece of text or document, as specified in the Methods section (i.e., the "Sentiment" command) of the request. As a non-limiting example, the text mining service can return the following:

```
<?xml version="1.0" encoding="UTF-8" standalone="yes"?>
<AIserver Version="3.0">
<ErrorID Type="Status">0</ErrorID>
<ErrorDescription>Success</ErrorDescription>
<Results>
    <Sentiment>
        <SentenceLevel>
            <Sentence>
                <Text begin="6" end="44">This is a story about Gareth Hutchins.</Text>
                <Subjectivity score="10.0075">fact</Subjectivity>
                <Tone>neutral</Tone>
            </Sentence>
            <Sentence>
                <Text begin="45" end="109">He lives in Farnham in Surrey and works for Opentext in Reading.</Text>
                <Subjectivity score="9.7272">fact</Subjectivity>
                <Tone>neutral</Tone>
            </Sentence>
            <Sentence>
                <Text begin="110" end="127">He's pretty cool.</Text>
                <Subjectivity score="79.8701">opinion</Subjectivity>
                <PositiveTone score="38.471"/>
                <NegativeTone score="24.893"/>
                <Tone>positive</Tone>
            </Sentence>
        </SentenceLevel>
        <DocumentLevel>
            <Subjectivity score="75.0036" distribution="17.2043">opinion</Subjectivity>
            <PositiveTone score="25.3561" distribution="17.2043"/>
            <NegativeTone score="16.4069" distribution="0.0"/>
            <Tone>positive</Tone>
        </DocumentLevel>
    </Sentiment>
</Results>
```

In some embodiments, the call made by document capture server 220 can include a knowledge base identifier. Using different knowledge bases may change the results returned by AI platform 630. Such a knowledge base identifier is not required when making a call to AI platform 630. In some embodiments, AI platform 630 can determine, as appropriate to the text contained in the call, which knowledge base (e.g., taxonomy) to use in processing the call.

As a non-limiting example, the International Press Telecommunications Council (IPTC) is the global standards body of the news media. AI platform 630 can include an IPTC taxonomy. Below provides a non-limiting example showing how to utilize the IPTC taxonomy or knowledge base (KB) to summarize a piece of text or text block into one sentence. In this example, a command is added to the Methods section as follows:

```
<Methods>
    <summarizer>
```

```
            <Sentences>1</Sentences>
            <KBid>IPTC</KBid>
        </summarizer>
    </Methods>
```

Below provides an example of a structure that is returned in the Results section:

```
<Results>
    <summarizer>
```

```
            <Summary>[A Summary of text]</Summary>
        </summarizer>
</Results>
```

AI platform 230 provides different taxonomies for NLP text mining engine 235. Further, a user can create a taxonomy and direct NLP text mining engine 235 to use the user-created taxonomy to perform the summarization.

Other features of NLP text mining engine 235 can be utilized in a similar way, for instance, by adding respective methods (e.g., entity extraction, concept extraction, categorization, etc.) to the call. In response to a call, AI platform 230 may utilize its components as directed by the call to process the text contained in the call and return the results accordingly.

Still in capture process 100, the document capture server computer can validate the results returned by the AI platform (115). This can include, for instance, running data integrity checks on the data returned by the AI platform and/or prompting an authorized user to validate the data returned by the AI platform (e.g., as part of data validation stage 226). The latter can ensure what the machine (the AI platform) understood from reading the unstructured content is consistent or agrees with human understanding of the same content. For example, if the AI platform returns a tonality analysis result indicating a negative tone of a letter, the document capture server computer can prompt an authorized user to validate or invalidate that result. If the machine did not get the tonality of the letter right (e.g., the tone of the letter is not negative but rather neutral), the document capture server computer can provide the user's feedback/correction to the AI platform. The AI platform, in turn, can utilize the user's feedback (to any of the NLP text mining results provided by the AI platform) as part of supervised learning (or semi-supervised learning) to improve its future analyses.

At the end of capture process 100, the document capture server computer can export or provide the captured content, including the document image, the textual information, and the NLP text mining results ("AI data") from the AI platform to a content repository or a computing facility (e.g., ECM 250) operating in an enterprise computing environment (120). In some embodiments, the document capture server computer can start or cause the start of a business process relating to the captured content (e.g., business process 260). For instance, an insurance claim or letter (on paper) is captured and processed by the document capture server and, at the end of capture process 100, the document capture server can start or trigger a process to process the insurance claim. As this example illustrates, since the letter had already been processed during capture process 100, the document capture server can provide a rich set of information to jump start the process (e.g., the claimant name, address, the nature of the insurance claim, the type of insurance, or even the sentiment of the letter, etc.). Other types of system/process integration are also possible (e.g., content management, record management, case management, workflow management, etc.).

With capture process 100, documents are processed during capture. This allows electronic workflows and/or processes in an enterprise to include paper documents. Further, a workflow or process can be triggered or otherwise initiated by the capture of a paper document (e.g., submission of an insurance claim, a loan application, a complaint letter, a request for leave, etc.). A non-limiting example of this process will now be described with reference to FIGS. 3A-5.

FIG. 3A depicts an example of original document 300 written by an insurance policy holder to an automobile insurance company concerning a road accident that resulted in an insured car being damaged. Document 300 represents an example of unstructured content. None of these details is initially known to a document capture server computer when document 300 was first captured and converted into an electronic format (e.g., an image file).

FIG. 3B depicts a version of document 300 shown in FIG. 3A. Through the data preparation and classification/extraction stages described above, the document capture server computer is operable to extract pieces of information (e.g., document attributes such as address, policy number, email address, date, and vehicle registration number) that might be useful for subsequent processing.

FIG. 3C depicts another version of document 300 shown in FIG. 3A. This version shows examples of the kinds of additional data that can be captured by an NLP text mining engine of an AI platform according to some embodiments. As described above, the NLP text mining engine can distinguish between entities such as people, places, and organizations, utilizing a dictionary of proper nouns. The AI platform can include additional controlled vocabularies (taxonomies) such as cars, musical instruments, etc. The NLP text mining engine can continuously learn new vocabularies and normalize data where necessary (e.g., "Sainsbury's" can be normalized to "Sainsbury"). In the example of FIG. 3C, the NLP text mining engine is able to identify new named entities from document 300.

Although not shown in FIG. 3C, the NLP text mining engine can, as described above, programmatically examine the input text and determine that the best topic (or category) for document 300 is auto insurance and that, based on linguistic and statistical patterns (e.g., keywords and key phrases), the purpose (or concept) of document 300 is to request insurance coverage. Further, the NLP text mining engine can determine a sentiment for a sentence, paragraph, or entire document 300. As a non-limiting example, the word "damage" in document 300 was followed by the word "caused," which is followed by the word "prevent," which is followed by the word "me" in the sentence" "A reasonable amount of damage was caused to the door, preventing me from opening it." Utilizing an NLP model that has been trained using previous auto insurance claims, the NLP text mining engine can determine that this sentence has a negative tone. Each sentence in a paragraph can be analyzed in a similar way. A sentiment or tonality of a paragraph can be determined utilizing individual tone values from the sentences in the paragraph. Likewise, a sentiment or tonality of a document can be determined utilizing individual values from all the sentences and/or paragraphs in the document.

Figure 4:
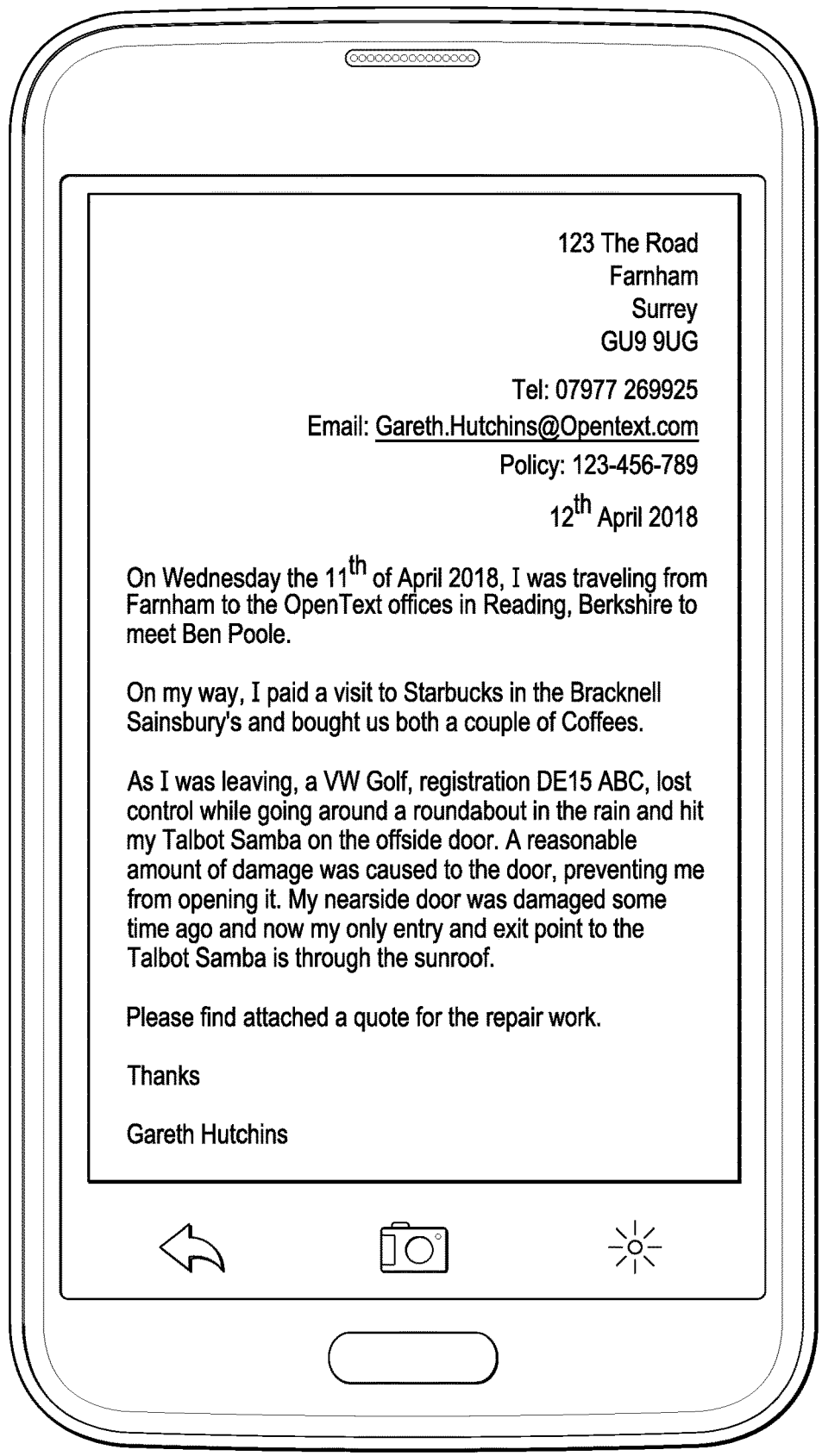
FIG. 4 depicts a diagrammatic representation of an example of a paper document being captured on a smart phone through a document capture client or mobile application according to some embodiments.

As described above, a paper document may be captured as an image on a user device and sent to a document capture server computer for processing. FIG. 4 depicts a diagrammatic representation of a non-limiting example of a paper document (e.g., document 300) being captured on a smart phone through a client document capture module (or a mobile application having a document capture function) according to some embodiments. In the example of FIG. 4, once started, the mobile application provides a user with three options (which, in this example, are shown as three user interface elements or icons at the bottom of the screen): a forward function, a document capture function, and an image enhancement function. The forward function is operable to send a captured image to an instance of a document capture server running on the document capture server computer. The document capture function activates the camera of the smart phone to take a picture. The image enhancement function allows the user to adjust the quality of the picture.

Accordingly, as a non-limiting example, the user can take a picture of the paper document, adjust the quality of the picture if necessary or desired, and send the picture to the document capture server computer. Almost instantaneously (with only operational delay such as network latency and the mobile device's processing speed), the document capture server computer can send a response back to the mobile application with AI-augmented processing results.

Figure 5:
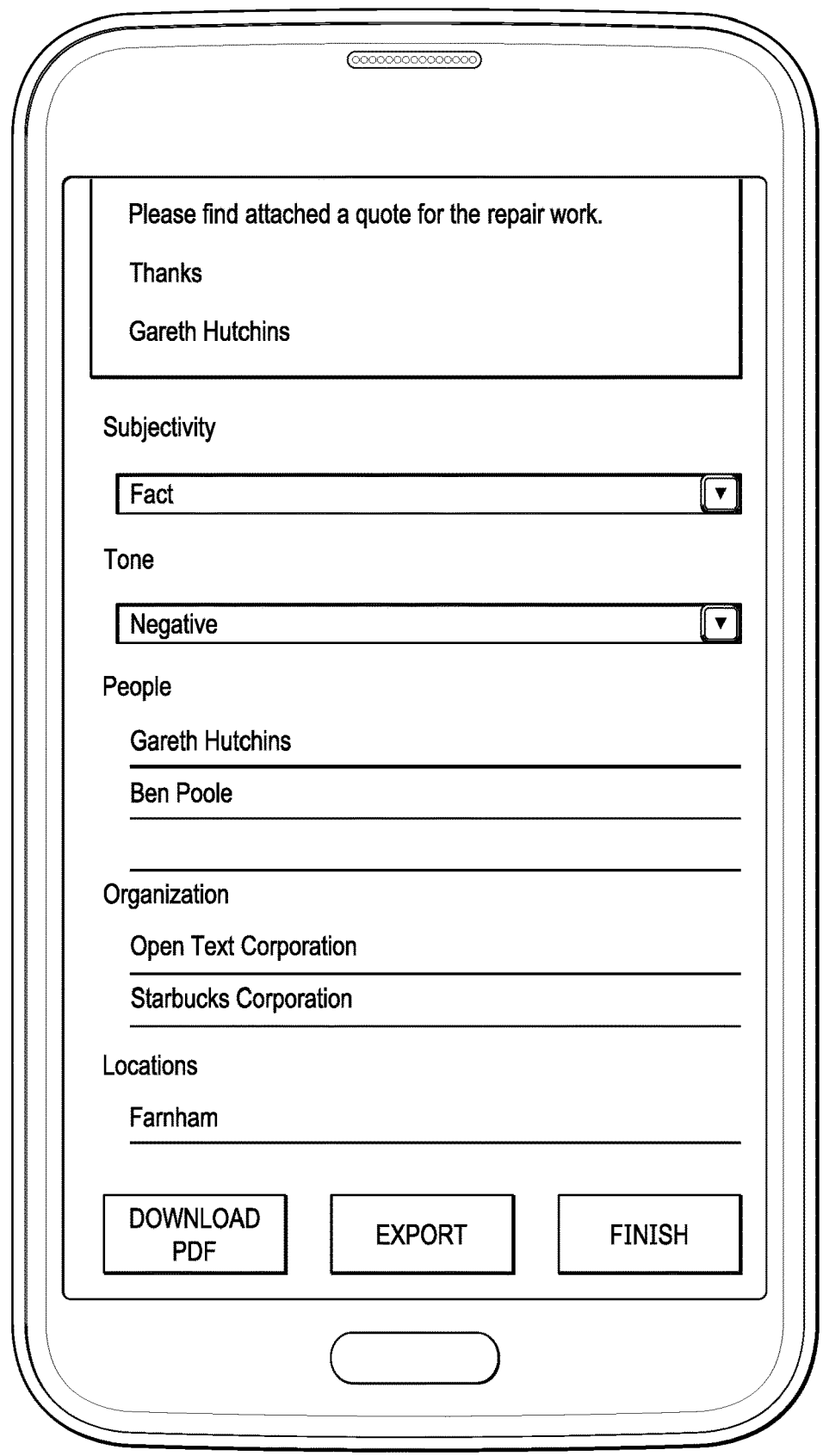
FIG. 5 depicts an example of additional data mined from the document shown in FIG. 4 and returned to the document capture client or mobile application according to some embodiments.

As illustrated in FIG. 5, the AI-augmented processing results can be displayed on the smart phone in the form of a new page by the mobile application. In this non-limiting example, the AI-augmented processing results can include information determined by the document capture server as well as the additional information that the document capture server obtained from the NLP text mining engine of the AI platform. The user can review the captured information and determine whether to download, export the captured document, or exit the mobile application. At the backend, the document capture server can take appropriate action on the additional information that the document capture server obtained from the NLP text mining engine of the AI platform (e.g., validate the data provided by the NLP text mining engine, export to an ECM system, initiate a backend process, etc.).

Figure 6:
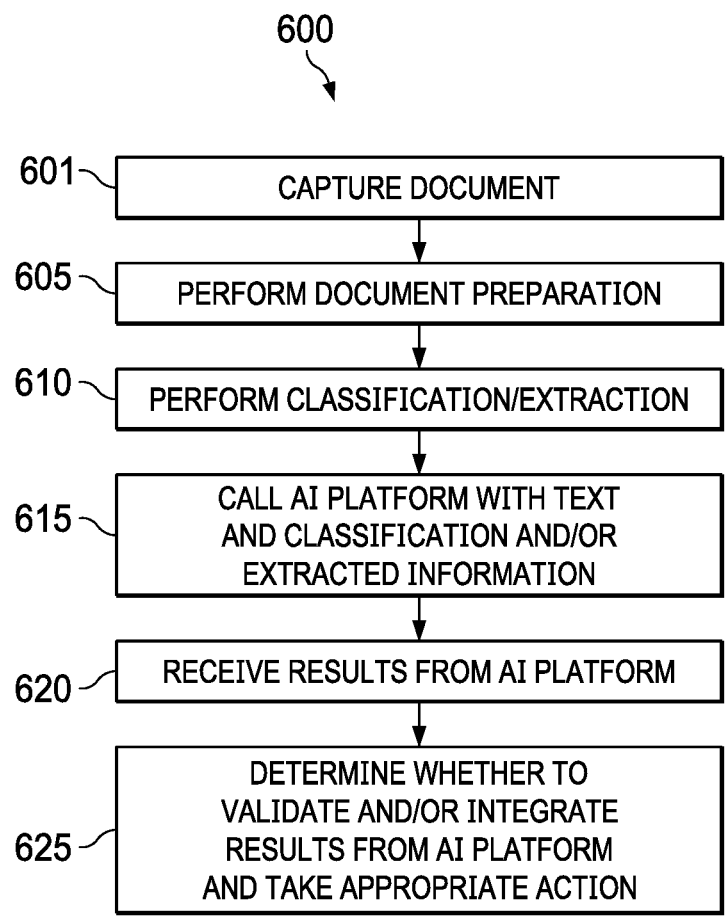
FIG. 6 depicts a flow chart illustrating an example of a method for AI-augmented document capture and processing according to some embodiments.

In this way, documents can be processed during capture and the processing can be augmented utilizing AI. FIG. 6 depicts a flow chart illustrating an example of method 600 for AI-augmented document capture and processing.

In some embodiments, method 600 begins when a document capture server "captures" a document (601). This capture can be facilitated by a user uploading a picture of a paper document (as shown in FIG. 4) or the document capture server importing or receiving a document (e.g., an image file) from a data source (e.g., a network scanner, a network copier, a network printer, a fax server, an email server, a backend system, etc.). The document capture server then performs document preparation as described above (which can be done in a pipeline involving ingestion, format conversion, image enhancement, full text OCR) (605). This step can produce an electronic document in a format that is appropriate for further processing, as well as textual information.

The prepared document and the textual information can undergo a classification process (which can also be done in a pipeline that includes graphical classification, keyword classification, zonal extraction, and freeform extraction), to determine the type of the document (e.g., a contract, a complaint, a correspondence, a purchase order, a credit card application, etc.) based on its content (610). As described above, at this step, the document capture server can examine the layout of the document and, from the layout, determine a class or type of the document. For instance, suppose the layout matches a credit card application form. Such a document can be considered as containing structured or semi-structured data and, as such, the document capture server can extract values from directly from the document and does not need additional data from an AI platform. In such cases (of structured/semi-structured documents), the document capture server can proceed to data validation (e.g., data integrity checks, user validation, etc.) without calling the AI platform.

Suppose the document capture server cannot determine a document type from the layout (e.g., an email, a letter, etc. that does not have a structure or form), the document capture server can examine the textual content of the document, extract keywords from the content, and determine a class or type from the keywords thus extracted.

The document capture server can then make a call (e.g., a web service call) to an AI platform (e.g., through an API of an NLP text mining engine operating on a server computer of the AI platform) with the textual information (e.g., the body of the email or letter, the classification, and the extracted information) (615). Suppose an email is classified as "accounts payable." Optionally, the web service call can include an identification of a knowledge base that is specific to "accounts payable." The AI platform can have many knowledge bases trained on different types of documents such as account payable, auto insurance claims, home insurance claims, medical documents, etc. If no knowledge base is specified in the call, the AI platform can determine an appropriate knowledge base to use, for instance, based on a policy number that the AI platform determines as a car insurance policy number (e.g., based on the policy number format). A benefit of knowing which knowledge base to use is that it may produce more accurate results as each knowledge base is trained on a particular type of subject. For instance, a medical knowledge base could include information on different kinds of fracture, a home insurance knowledge base could include information on power outage and a 300 lb. salmon spoiled due to power outage, etc.

The AI platform can (e.g., through the NLP text mining engine) analyze the textual content, or the portion thereof, of the document and return additional, insightful data such as a sentiment, a tone, a named entity, a category, a concept, etc., as described above. The document capture server can receive the additional data from the AI platform in real time or near real time, with only operational delay (620).

The document capture server computer can validate the additional data returned by the AI platform, integrate the document and the additional data with another process or system, and/or provide the document and the additional data to a content repository or a computing facility operating in an enterprise computing environment (625). As described above, in some cases, a validation result (e.g., a validated concept, a validated named entity, etc.) from the data validation process can be provided by the document capture server to the AI platform. In turn, the AI platform can utilize the feedback from the document capture server to improve its future analyses of the same type of documents.

The process described above can be implemented in many ways. For example, the document capture server can be configured with a "master" workflow or process that is operable to process a document (e.g., an email, a letter, a fax, a scan, etc.) and shepherd the document from one step to another (e.g., ingestion from a data source, document preparation, classification/extraction, AI-augmented processing, data validation, system/process integration, exportation to an ECM system, initiation of a business process, feedback to the AI platform, etc.). This master document capture workflow or process flow can be defined by a user of the document capture server (e.g., through a workflow facility or user interface with a workflow function). Throughout the master document capture workflow or process flow, the document can be identified via a globally unique identifier assigned by the document capture server computer (e.g., upon capture of the document).

Such a master document capture workflow or process flow may include workflow tasks such as determining a document type (e.g., from various types of documents such as invoices, purchase orders, contracts, complaints, forms, insurance claims, etc.), parsing text from the document, calling the AI platform with the parsed text (e.g., a block of text) and parameters specifying AI service(s) (e.g., a parameter for named entities such as people or organization names, or everything, in the block of text), receiving results from the AI platform (e.g., people names such as "Gareth," organization names such as "Open Text," etc.), determining whether the results are useful (e.g., whether "Gareth" and "Open Text" are relevant to the document type), and taking an appropriate action or causing an appropriate action to be taken (e.g., responsive to "Open Text" being relevant to the document type, adding "Open Text" as an organization for the document type or, responsive to "Open Text" not being relevant to the document type, removing "Open Text" as an organization from documents of the same type in the future, responsive to an indication of a car accident insurance claim, initiating a car accident insurance claim workflow, responsive to an indication of a customer complaint about a product, forwarding the customer complaint to a supervisor or customer service representative, responsive to a request for refund of overpayment, issuing a refund, etc.). Such actions can include those performed by the document capture server computer, a subsequent computing facility such as an ECM system, or a user.

Additional tasks can be triggered. For instance, suppose "Open Text" is added as an organization, the master document capture workflow or process flow may further include making another web service call to the AI platform, indicating that "Open Text" is added as an organization. This feedback can be used by the AI platform to enhance its entity extraction, concept extraction, sentiment analysis, etc. As another example, the master document capture workflow or process flow may further include adding a weight (i.e., putting a bias) to a named entity. For instance, a named entity "London" can weigh more when mentioned in close proximity to "UK," and can weigh less when mentioned in close proximity to "Canada." Such weights can be passed to the AI platform for use in creating concepts (e.g., this email is about "Gareth," "Open Text," and "coffee" and, as such, the AI platform can update a knowledge base to include "coffee" as a concept associated with a document containing "Gareth" and "Open Text"). All of the tasks in the master document capture workflow can be accomplished in real time (or in near real time with only operational delay), in one process flow, and seamlessly integrating document capture, AI analytics, and document management to achieve an intelligent, AI-driven efficient document capture solution.

Figure 7:
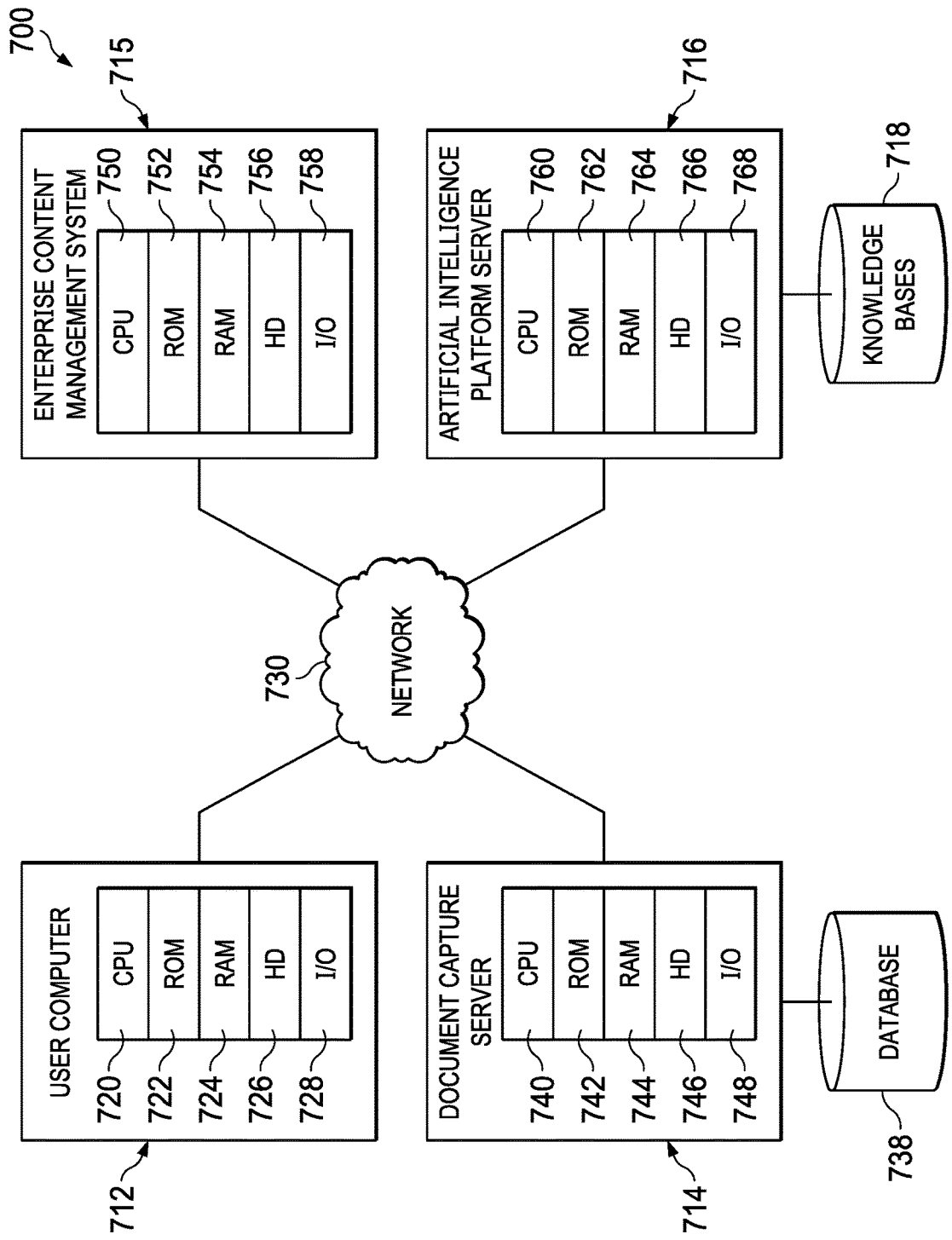
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example of FIG. 7, network computing environment 700 may include network 730 that can be bi-directionally coupled to user computer 712, ECM system 715, document capture server 714, and AI platform server 716. Document capture server 714 can be bi-directionally coupled to database 738 and AI platform server 716 can be bi-directionally coupled to data store 718. Network 730 may represent a combination of wired and wireless networks that network computing environment 700 may utilize for various types of network communications known to those skilled in the art.

For the purpose of illustration, a single system is shown for each of user computer 712, ECM system 715, document capture server 714, and AI platform server 716. However, within each of user computer 712, ECM system 715, document capture server 714, and AI platform server 716, a plurality of computers (not shown) may be interconnected to each other over network 730. For example, a plurality of user computers may be communicatively connected over network 730 to document capture server 714 operating in an enterprise computing environment and a plurality of user computers may be communicatively connected over network 730 to ECM system 715 and/or AI platform server 716.

User computer 712 may include data processing systems for communicating with document capture server 714. For example, user computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. User computer 712 can include a desktop computer, a laptop computer, a personal digital assistant, a cellular phone, or nearly any device capable of communicating over a network.

Likewise, ECM system 715 may include data processing systems for communicating with document capture server 714 and/or AI platform server 716. Document capture server 714 may include CPU 740, ROM 742, RAM 744, HD 746, and I/O 748 and AI platform server 716 may include CPU 760, ROM 762, RAM 764, HD 766, and I/O 768. Document capture server 714 and AI platform server 716 may each include one or more modules and UIs configured for providing services to user computer 712 and ECM system 715 over network 730. ECM system 715 may be similar to AI platform server 716 and can comprise CPU 750, ROM 752, RAM 754, HD 756, and I/O 758. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712, 714, 715, and 716 is an example of a data processing system. ROM 722, 742, 752, and 762; RAM 724, 744, 754, and 764; HD 726, 746, 756, and 766; and permission data store 718 and content server database 738 can include media that can be read by CPU 720, 740, 750, or 760. Therefore, these types of memories include non-transitory computer-readable storage media. These memories may be internal or external to computers 712, 714, 715, or 716.

Portions of the methods described herein may be implemented in suitable software code that may reside within ROM 722, 742, 752, or 762; RAM 724, 744, 754, or 764; or HD 726, 746, 756, or 766. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a CPU, a ROM, a RAM, a HD, and I/O device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
   receiving, by a document capture server computer from a document capture module running on a client device, an image of a paper document;
   processing, by the document capture server computer, the image received from the document capture module on the client device into an electronic document, the processing producing textual content of the electronic document;
   extracting, by the document capture server computer, keywords from the textual content of the electronic document;
   classifying the electronic document, the classifying performed by the document capture server computer based at least in part on the keywords extracted from the textual content of the electronic document;
   making, by the document capture server computer, a call to an artificial intelligence (AI) platform server computer, the call containing the textual content of the electronic document and a class of the electronic document, wherein the AI platform server computer analyzes the textual content of the electronic document utilizing the class and returns additional data including a sentiment of the textual content of the electronic document;
   validating, by the document capture server computer, the additional data returned by the AI platform server computer; and
   providing the electronic document and the additional data to a content repository or a computing facility operating in an enterprise computing environment.

2. The method according to claim 1, wherein the call includes an identification of a knowledge base accessible by the AI platform server computer, the knowledge base specific to the class of the electronic document.

3. The method according to claim 1, wherein the additional data includes at least an entity, a summary, a category, or a concept that the AI platform server computer learned from the textual content.

4. The method according to claim 1, further comprising:
   providing a validated concept or entity from the validating to the AI platform server computer to improve future analyses by the AI platform server computer.

5. The method according to claim 1, wherein the processing comprises performing at least a format conversion on the image, an image enhancement on the image, or an optical character recognition procedure on the image.

6. The method according to claim 1, further comprising:
   determining a graphical layout of the electronic document; and
   classifying the electronic document based at least in part on the graphical layout of the electronic document.

7. The method according to claim 1, further comprising:
   performing a zonal extraction of a form in the image; or
   performing a freeform extraction for a regular expression in the image.

8. A system, comprising:
   a processor;
   a non-transitory computer-readable medium; and
   stored instructions translatable by the processor to perform:
      receiving, from a document capture module running on a client device, an image of a paper document;
      processing the image received from the document capture module on the client device into an electronic document, the processing producing textual content of the electronic document;
      extracting keywords from the textual content of the electronic document;
      classifying the electronic document, the classifying based at least in part on the keywords extracted from the textual content of the electronic document;
      making a call to an artificial intelligence (AI) platform server computer, the call containing the textual content of the electronic document and a class of the electronic document, wherein the AI platform server computer analyzes the textual content of the electronic document utilizing the class and returns additional data including a sentiment of the textual content of the electronic document;
      validating the additional data returned by the AI platform server computer; and
      providing the electronic document and the additional data to a content repository or a computing facility operating in an enterprise computing environment.

9. The system of claim 8, wherein the call includes an identification of a knowledge base accessible by the AI platform server computer, the knowledge base specific to the class of the electronic document.

10. The system of claim 8, wherein the additional data includes at least an entity, a summary, a category, or a concept that the AI platform server computer learned from the textual content.

11. The system of claim 8, wherein the stored instructions are further translatable by the processor to perform:
    providing a validated concept or entity from the validating to the AI platform server computer to improve future analyses by the AI platform server computer.

12. The system of claim 8, wherein the processing comprises performing at least a format conversion on the image, an image enhancement on the image, or an optical character recognition procedure on the image.

13. The system of claim 8, wherein the stored instructions are further translatable by the processor to perform:
   determining a graphical layout of the electronic document; and
   classifying the electronic document based at least in part on the graphical layout of the electronic document.

14. The system of claim 8, wherein the stored instructions are further translatable by the processor to perform:
   performing a zonal extraction of a form in the image; or
   performing a freeform extraction for a regular expression in the image.

15. A computer program product comprising a non-transitory computer readable medium storing instructions translatable by a processor to perform:
   receiving, from a document capture module running on a client device, an image of a paper document;
   processing the image received from the document capture module on the client device into an electronic document, the processing producing textual content of the electronic document;
   extracting keywords from the textual content of the electronic document;
   classifying the electronic document, the classifying based at least in part on the keywords extracted from the textual content of the electronic document;
   making a call to an artificial intelligence (AI) platform server computer, the call containing the textual content of the electronic document and a class of the electronic document, wherein the AI platform server computer analyzes the textual content of the electronic document utilizing the class and returns additional data including a sentiment of the textual content of the electronic document;
   validating the additional data returned by the AI platform server computer; and
   providing the electronic document and the additional data to a content repository or a computing facility operating in an enterprise computing environment.

16. The computer program product of claim 15, wherein the call includes an identification of a knowledge base accessible by the AI platform server computer, the knowledge base specific to the class of the electronic document.

17. The computer program product of claim 15, wherein the additional data includes at least an entity, a summary, a category, or a concept that the AI platform server computer learned from the textual content.

18. The computer program product of claim 15, wherein the instructions are further translatable by the processor to perform:
   providing a validated concept or entity from the validating to the AI platform server computer to improve future analyses by the AI platform server computer.

19. The computer program product of claim 15, wherein the processing comprises performing at least a format conversion on the image, an image enhancement on the image, or an optical character recognition procedure on the image.

20. The computer program product of claim 15, wherein the instructions are further translatable by the processor to perform:
   determining a graphical layout of the electronic document; and
   classifying the electronic document based at least in part on the graphical layout of the electronic document.

* * * * *